United States Patent [19]

Howard

[11] Patent Number: 4,697,866

[45] Date of Patent: Oct. 6, 1987

[54] APPARATUS AND METHOD FOR FABRICATING A SANDWICH LENS

[75] Inventor: James W. Howard, Natick, Mass.

[73] Assignee: Honeywell Inc., Minneapolis, Minn.

[21] Appl. No.: 660,775

[22] Filed: Oct. 15, 1984

[51] Int. Cl.⁴ .............................................. G02B 1/10
[52] U.S. Cl. ...................................... 350/1.4; 350/417; 350/320
[58] Field of Search ................... 350/1.1, 1.2, 1.3, 1.4, 350/320, 321, 322, 417, 479, 481; 427/166; 351/172, 164

[56] References Cited

U.S. PATENT DOCUMENTS

| | | | |
|---|---|---|---|
| 1,332,410 | 3/1920 | Potts | 350/417 |
| 1,671,548 | 5/1928 | Schlitzer | 350/417 |
| 2,015,007 | 9/1935 | Emerson | 350/417 |
| 2,275,602 | 3/1942 | Beck et al. | 350/417 |
| 2,317,790 | 4/1943 | Mellor | 350/479 |
| 2,394,721 | 2/1946 | Simmons et al. | 350/417 |
| 3,157,521 | 11/1964 | Cary et al. | 350/417 |
| 3,248,460 | 4/1966 | Naujokas | 350/417 |
| 3,674,330 | 7/1972 | Strong | 350/1.4 |
| 3,811,753 | 5/1974 | Onoki et al. | 350/417 |
| 3,917,766 | 11/1975 | Howden | 350/417 |
| 4,296,143 | 10/1981 | Franken et al. | 350/417 |
| 4,428,979 | 1/1984 | Nakamura et al. | 427/166 |
| 4,482,217 | 11/1984 | Nagler | 350/479 |

Primary Examiner—John K. Corbin
Assistant Examiner—Loha Ben
Attorney, Agent, or Firm—John S. Solakian; George A. Leone, Sr.

[57] ABSTRACT

An improved composite lens is described which provides higher optical transmittance and lower weight and cost than a conventional ZnSe/ZnS doublet. A method of manufacture is also described which uses a process of chemical vapor disposition of one material (e.g. ZnSe) on a blank of another material (e.g. ZnS), combined with well-known optical machining and polishing processes to obtain the desired curvatures on the lens surfaces.

13 Claims, 3 Drawing Figures

1

APPARATUS AND METHOD FOR FABRICATING A SANDWICH LENS

BACKGROUND OF THE INVENTION

The apparatus and method of the present invention relate to lens components for multispectral optical systems, and, more particularly, to, for example, a zinc selenide/zinc sulfide (ZnSe/ZnS) doublet structure used in infrared common aperture optical systems.

In a common aperture infrared device, a laser is used to designate and find the range of targets in the scene, and a Forward Looking Infrared device ("FLIR") views the scene. In these devices, the laser and the FLIR share a common optical train in order to insure that the FLIR views the scene illuminated by the laser. Thus, the laser source will pass through one or more of the FLIR elements, as well as the shared device window.

Typically, these FLIRs view in the 8–12 micron waveband, while the illumination source is typically a Neodimium YAG laser operating at 1.06 microns. One obvious requirement of the shared lenses is that they transmit in both spectral ranges, 8–12 microns and 1.06 microns. In addition, the lens material must have stable mechanical properties, and the desired optical properties, such as index of refraction and dispersion.

Often such systems will use a ZnSe/ZnS doublet as the shared optical element, for example, as a FLIR telescope objective which is then shared with the laser designator. In the past, these doublets have been constructed by individually fabricating a positive ZnSe element and a negative ZnS element. A combination of these materials is required to compensate for the high relative dispersions of each respective material.

Such ZnSe/ZnS doublet design has several disadvantages. First, unlike many infrared telescope objectives, it includes two lenses rather than one. Since each element in the doublet must be thick enough to be individually structurally rigid, a doublet weighs more than a functionally similar singlet. This extra weight may be a critical problem in many airborne systems. Second, the transmittance of the lens is diminished because the ZnS element, which has relatively high absorption in the 8–12 micron waveband, is necessarily thick in order to provide structural rigidity to the lens.

It is, accordingly, a primary object of the present invention to provide an improved sandwich lens which is lighter and has higher transmittance, and has lower material cost than a traditional ZnSe/ZnS doublet.

SUMMARY OF THE INVENTION

The above and other objects of the present invention are achieved by manufacturing a lens blank sandwich of, for example, ZnSe and ZnS, and then machining the blank to form a single composite lens, which, although a singlet, is the optical equivalent of the ZnSe/ZnS doublet. The blank is manufactured by the well-known process of chemical vapor deposition of, for example, a thick layer of ZnSe on top of, for example, a post-deposition processed ZnS (water-clear) blank. This deposition process has been used in the past to fabricate ZnSe/ZnS windows for infrared optical systems. In such process, a very thin layer of ZnS is deposited on a larger planar ZnSe window in order to provide a hard, scratch resistant external window surface.

In a typical application of the apparatus and method of the present invention, a blank of a first material, e.g. ZnS, has deposited thereon a thick layer of a second material, e.g. ZnSe, and the curved lens surfaces are then generated on the outside surfaces of the composite blank by well-known machining and polishing processes. The resulting singlet is much lighter, and since it contains much less of the first material than a traditional doublet, it has higher transmittance.

BRIEF DESCRIPTION OF THE DRAWINGS

The above and other objects are achieved with respect to the illustrative embodiment in which.

DETAILED DESCRIPTION OF THE PREFERRED EMBODIMENT(S)

Figure 1:
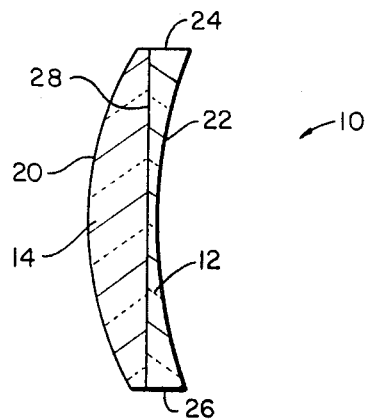
FIG. 1 shows a cross-section through the apparatus of the present invention.

Referring to FIG. 1, the apparatus of the present invention includes a lens 10, having a region 12 comprising a first material such as, for example, ZnS, and a region 14 comprising a second material such as, for example, ZnSe, where such first and second materials have different dispersion characteristics. Surfaces 20, 22, 24 and 26 may be machined in any desirable form. Similarly, contact plane 28 may take any desirable form, either planar or curved. Because of the composite structure of the lens there is no intermediate media, as in other ZnSe/ZnS doublet-type lenses.

Notwithstanding reference to the materials ZnS and ZnSe for purposes of describing the present invention, it should be understood that the first and second materials may be made from materials other than ZnSe and ZnS. For example, cadmium sulfide (CdS) or arsenic trisulfide ($AsS_3$) may be used. In addition, it should be understood that any of such materials may be used as the blank 34 as described with reference to FIG. 2 and that any other one of such materials may be deposited on such blank. For example, CdS may be deposited on a blank of ZnSe.

The shapes of surfaces 20, 22 and 28 are selected in accordance with well-known optical design techniques based on the requirements of the surrounding optical system. Thus, in the case of an achromatic telescope objective, surfaces 20, 22 and 28 may have the general shapes shown in FIG. 1. In alternate lens designs in which a ZnSe/ZnS doublet is used, other curvatures may be selected.

Figure 2:
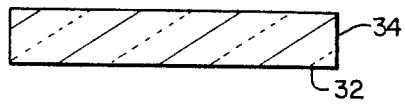
FIGS. 2 and 3 show, in cross-section, successive stages of manufacture of the present invention.
Figure 3:
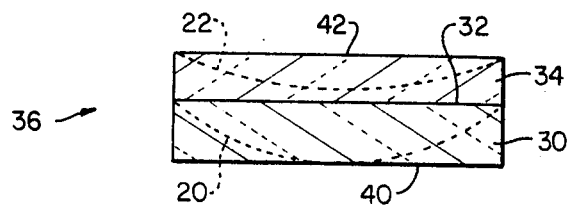

Referring to FIGS. 2 and 3, the fabrication process of the present invention is as follows. By way of example, the surface 32 (plane 28 in FIG. 1) of a post-deposition processed ZnS (water-clear) blank 34 is prepared for chemical deposition of the ZnSe material. This may be accomplished by polishing. As shown in FIG. 3, a thick layer of ZnSe 30 is deposited on surface 32 by the well-known technique of chemical vapor deposition, thereby forming sandwich blank 36. As shown in FIG. 3, the external surface 40 of deposition 30 and the external surface 42 of blank 34 are then machined and polished using typical lens fabrication techniques to form composite singlet lens 10, having surfaces 20 and 22 with the desired curvatures selected by the optical design process.

It should be understood that the convex surface 20 may be concave with the concave surface 22 being convex. It should be further understood that blank 34 may be thicker than deposition 30 or vice versa or may be of the same thickness without departing from the spirit and scope of the present invention.

Having described the invention, what is claimed as new and novel and for which it is desired to secure Letters Patent is:

1. A method for fabricating a composite lens comprising a first optical material and a second optical material, such lens having a desired shape and optical properties, said method comprising the steps of:
   A. providing a lens blank made from said first material, said blank having a planar inner surface and an outer surface;
   B. vapor depositing a thick layer of said second material on said planar inner surface of said blank, said layer having a planar inner surface substantially coincident with said planar inner surface of said blank thereby forming a coplanar contact area having a desired geometry, and said layer having an outer surface opposite said inner surface of said layer; and
   C. shaping said outer surface of said blank and said outer surface of said layer to provide said desired shape and optical properties.

2. A method as in claim 1 wherein said step of providing further comprises the steps of:
   A. machining said inner surface of said blank; and
   B. polishing said inner surface of said blank to form said contact area having said desired geometry.

3. A method as in claim 1 wherein said step of shaping comprises the step of machine and polishing said outer surface of said blank and said outer surface of said layer.

4. A method as in claim 1 wherein said first material is less dispersive than said second material.

5. A method as in claim 1 wherein said second material is less dispersive than said first material.

6. A method as in claim 1 wherein the thickness of said first material is different from the thickness of said second material.

7. A method as in claim 1 wherein said first material may be chosen from anyone of the following materials: zinc selenide (ZnSe), zinc sulfide (ZnS), cadmium sulfide (CdS), or arsenic trisulfide ($AsS_3$).

8. A method as in claim 7 wherein said second material may be chosen from any one of said materials ZnSe, ZnS, CdS or $AsS_3$ which is not chosen for said first material.

9. A method as in claim 1 wherein said blank is made of zinc sulfide (ZnS.)

10. A material as in claim 9 wherein said zinc sulfide is a post-deposition processed ZnS.

11. A zinc selenide(ZnSe)/zinc sulfide(ZnS) doublet apparatus, said apparatus having desired optical properties and transmittance, said apparatus comprising:
    A. a first region comprising ZnS, said first region having a planar inner surface with a desired geometry, an outer surface, and a desired thickness between said inner and outer surfaces;
    B. a second region comprising ZnSe, said second region having a planar inner surface substantially coincident with said planar inner surface of said first region, an outer surface opposite said inner surface of said second region, and said second region vapor deposited on said first region to a desired thickness when measured between said inner and said outer surfaces of said second region; and
    C. wherein the shape of said outer surface of said first region, and said first and second desired thicknesses are selected to provide said desired optical properties.

12. Apparatus as in claim 11 wherein the geometry of said inner surfaces of said first and second regions is substantially planar.

13. Apparatus as in claim 11 wherein said ZnS of said first region is made of post-deposition processed ZnS.

* * * * *